(12) United States Patent
Titus et al.

(10) Patent No.: US 12,423,610 B2
(45) Date of Patent: Sep. 23, 2025

(54) ESTIMATION OF GLOBAL THERMAL CONDITIONS VIA COSIMULATION OF MACHINE LEARNING OUTPUTS AND OBSERVED DATA

(71) Applicant: Landmark Graphics Corporation, Houston, TX (US)

(72) Inventors: Zainab Diana Titus, London (GB); Annabel Causer, Exeter (GB); Graham Baines, Abingdon (GB); Christine Yallup, Abingdon (GB); Olutobi Adeyemi, Didcot (GB); Marc Paul Servais, Reading (GB)

(73) Assignee: Landmark Graphics Corporation, Houston, TX (US)

( * ) Notice: Subject to any disclaimer, the term of this patent is extended or adjusted under 35 U.S.C. 154(b) by 1161 days.

(21) Appl. No.: 16/929,191

(22) Filed: Jul. 15, 2020

(65) Prior Publication Data
US 2022/0019933 A1   Jan. 20, 2022

(51) Int. Cl.
*G06N 20/00*   (2019.01)
*G01K 17/08*   (2006.01)
(Continued)

(52) U.S. Cl.
CPC ............ *G06N 20/00* (2019.01); *G01K 17/08* (2013.01); *G06F 18/15* (2023.01); *G06F 18/214* (2023.01)

(58) Field of Classification Search
CPC ............ G06N 20/00; G06N 3/08; G06N 5/01; G06N 20/20; G06N 20/10; G06F 18/10;
(Continued)

(56) References Cited

U.S. PATENT DOCUMENTS

| 4,008,608 A | 2/1977 | Reynolds |
| 7,171,328 B1 | 1/2007 | Walker et al. |
| (Continued) | | |

FOREIGN PATENT DOCUMENTS

CN    104239673 B    9/2017

OTHER PUBLICATIONS

Rezvanbehbahani, S. et al., "Predicting the Geothermal Heat Flux in Greenland: A Machine Learning Approach", https://agupubs.onlinelibrary.wiley.com/doi/full/10.1002/2017GL075661 (Year: 2017).*

(Continued)

*Primary Examiner* — Alexey Shmatov
*Assistant Examiner* — Devika S Maharaj
(74) *Attorney, Agent, or Firm* — DeLizio, Peacock, Lewin & Guerra LLP

(57) ABSTRACT

A heat flow modeler preprocesses geological and heat flow data for an earth formation for inputting into a plurality of supervised learning models. The heat flow modeler trains the plurality of supervised learning models on the preprocessed geological data to estimate heat flow throughout the earth formation. The heat flow modeler interpolates the estimated heat flow values to a set of desired locations in the earth formation and cosimulates the preprocessed heat flow values with the interpolated heat flow values as auxiliary variables to generate a cosimulated heat flow map. A final heat flow map is generated by rasterizing the cosimulated heat flow map.

20 Claims, 5 Drawing Sheets

(51) Int. Cl.
*G06F 18/15* (2023.01)
*G06F 18/214* (2023.01)

(58) Field of Classification Search
CPC .... G06F 18/214; G01K 17/08; G01V 99/005; E21B 2200/22
See application file for complete search history.

(56) References Cited

U.S. PATENT DOCUMENTS

| | | | |
|---|---|---|---|
| 10,641,662 | B2 | 5/2020 | Yun et al. |
| 2019/0078944 | A1* | 3/2019 | Yun .................. G01V 1/30 |
| 2020/0012917 | A1 | 1/2020 | Pham et al. |
| 2023/0041525 | A1* | 2/2023 | Hong ................. G01V 1/46 |

OTHER PUBLICATIONS

PCT Application Serial No. PCT/US2020/042313, International Search Report, mailed Mar. 30, 2021, 3 pages.
PCT Application Serial No. PCT/US2020/042313, International Written Opinion, mailed Mar. 30, 2021, 4 pages.
Rezvanbehbahani, et al., "Predicting the Geothermal Heat Flux in Greenland: A Machine Learning Approach", Geophysical Research Letters, vol. 44, No. 24, pp. 12271-12279, Nov. 16, 2017, 10 pages.
Xingang, et al., "Machine Learning-Based Critical Heat Flux Predictors in Subcooled and Low-Quality Flow Boiling", Advances in Thermal Hydraulics 2018, 5 pages.
Davies, "Global map of solid Earth surface heat flow", Geochemistry, Geophysics, Geosystems, v. 14, No. 10, p. 4608-4622, 2013.
Goutorbe, et al., "Global heat flow trends resolved from multiple geological and geophysical proxies", Geophysical Journal International, v. 187, No. 3, p. 1405-1419, 2011.
Pollack, et al., "Heat Flow From the Earth's Interior: Analysis of the Global Data Set", Reviews of Geophysics (Formerly Reviews of Geophysics and Space Physics), v. 31, No. 3, p. 267-280, Aug. 1993.

* cited by examiner

ESTIMATION OF GLOBAL THERMAL CONDITIONS VIA COSIMULATION OF MACHINE LEARNING OUTPUTS AND OBSERVED DATA

BACKGROUND

The disclosure generally relates to subsurface formation evaluation and more particularly to geological heat flow modeling.

In order to have accurate heat flow and geothermal gradient values at a global scale, heat flow and geothermal gradient is estimated at locations where measurements are unavailable. Estimation of heat flow and geothermal gradient provides boundary conditions for workflows such as basin models that predict geothermal resource distribution, reservoir temperature, hydrocarbon generation, etc. Typical methods use empirical relationships between heat flow/geothermal gradient and other geological parameters to generate geostatistical estimations. These estimations are often aided by expert analysis based on prior knowledge about a subsurface formation.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to generating cosimulated heat flow maps of an earth formation using machine learning model outputs and observed heat flow data in illustrative examples. Aspects of this disclosure can be instead applied to generating cosimulated maps of other geological parameters such as crust thickness, sediment thickness, surface geology age, lithology, etc. In other instances, well-known instruction instances, protocols, structures and techniques have not been shown in detail in order not to obfuscate the description.

Overview

A heat flow modeler for accurately simulating heat flow maps of earth formations by cosimulating outputs of trained supervised machine learning algorithms with observed heat flow data is disclosed herein. Observational data for an earth formation (e.g. the earth, a region of the earth) is aggregated for several geological parameters and heat flow values. The heat flow modeler receives the aggregated observational data and filters out low quality data points to yield high-quality filtered observational data. The modeler normalizes the high-quality filtered observational data to be used to train several candidate supervised machine learning models for modeling heat flow throughout the earth formation. The modeler then evaluates validation error and training error for the trained supervised machine learning models and selects one as an optimal trained supervised machine learning model based on a model criterion. The optimal supervised machine learning model receives geological parameters for an earth formation to be modeled and generates an estimated map of heat flow values throughout the formation. The modeler then cosimulates heat-flow using the observed heat-flow values as the primary variable and the estimated map of heat flow derived from the machine-learning model as a secondary variable. Cosimulating (e.g. using kriging with external drift) the estimated/interpolated heat flow values with the observed heat flow values produces a final map that not only matches the observational data precisely, but also uses machine learning as a mechanism to guide interpolation between observations that integrates many geological parameters. Tests using previously unseen heat-flow observations show that the resulting cosimulated heat-flow map is more accurate than either a map interpolated from observations alone (e.g. using inverse distance weighting) or an estimated map of heat-flow derived from a supervised machine learning model and so allows for reliable estimation of past and present heat flow for the earth formation.

Example Illustrations

Figure 1:
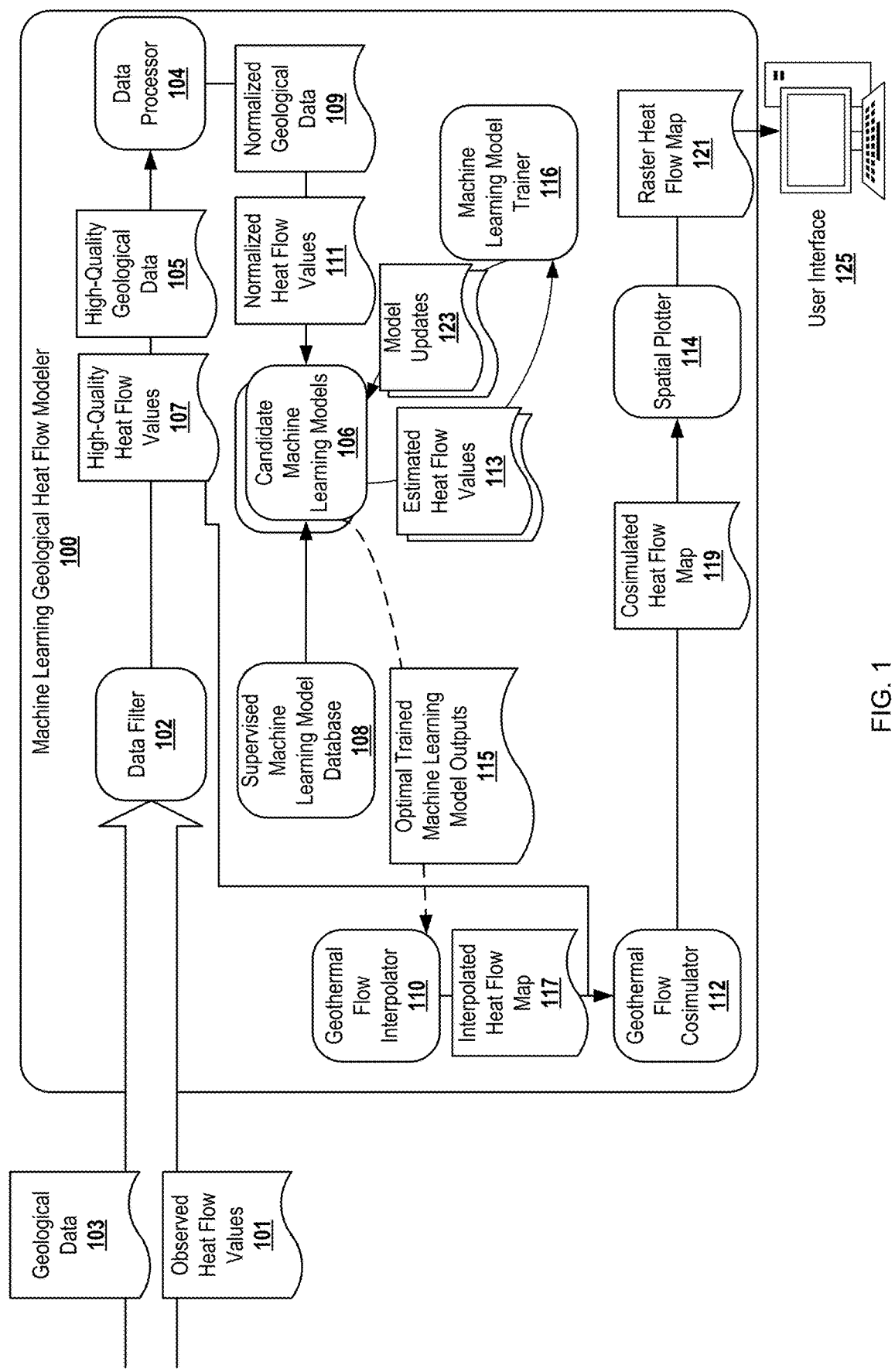
FIG. 1 is a schematic diagram of a machine learning geological flow modeler that generates a raster heat flow map by cosimulating observed heat flow data and supervised machine learning model outputs.

FIG. 1 is a schematic diagram of a machine learning geological heat flow modeler that generates a raster heat flow map by cosimulating observed heat flow data and supervised machine learning model outputs. A data filter 102 running on a machine learning geological heat flow modeler 100 receives observed heat flow values 101 and geological data 103 for an earth formation. The data filter 102 parses the observed heat flow values 101 and the geological data 103 to generate high-quality geological data 105 and high-quality heat flow values 107. A data processor 104 receives the high-quality geological data 105 and the high-quality heat flow values 107 and normalizes them for training multiple candidate machine learning models 106 obtained from a supervised machine learning model database 108. Each of the candidate machine learning models 106 from the supervised machine learning model database 108 receives normalized geological data 109 and normalized heat flow values 111 from the data processor 104. A machine learning model trainer 116 trains each of the candidate machine learning models 106 to estimate the normalized heat flow values 111 by inputting the normalized geological data 109 to generate estimated heat flow values 113 and updating internal parameters as model updates 123 based on the difference between the estimated heat flow values 113 and the normalized heat flow values 111. Once each of the candidate machine learning models 106 is trained, a geothermal flow interpolator 110 receives optimal trained machine learning model outputs 115 from the one of the candidate machine learning models 106 that most satisfies a model selection criterion. The geothermal flow interpolator 110 then generates an interpolated heat flow map 117 for heat flow throughout the earth formation. A geothermal flow cosimulator 112 generates a cosimulated heat flow map 119 by cosimulating the interpolated heat flow map 117 and the normalized heat flow values 111. Finally, a spatial plotter 114 generates a raster heat flow map 121 using the cosimulated heat flow map 119 which it sends to a user interface 125 for display.

FIG. 1 depicts various operations related to observing, transforming, and estimating heat flow data. Alternatively, any of these operations can be performed using geothermal gradient data. Geothermal gradient measures the rate of temperature change along the vertical axis of an earth formation. The heat flow and geothermal gradient are related through the following equation:

$$q = -c\frac{dT}{dz}$$

where q is the heat flow, c is the thermal conductivity, T is the temperature, and z is the formation depth (thus, $$\frac{dT}{dz}$$

is the geothermal gradient). Therefore, one can derive geothermal gradient from heat flow if measurements of thermal conductivity are available, and vice-versa. Estimating the geothermal gradient allows for prediction of subsurface temperatures by propagating surface temperature data down the earth formation using the estimated geothermal gradient values. The final raster heat flow map 121 can instead be a raster map of geothermal gradient throughout the earth formation.

The geological data 103 can comprise age, lithology, sediment thickness, digital elevation, topographic variability, basement age/type/affinity, free air gravity, magnetic anomalies, locations of geological features including rifts, depth to Mohorovicic discontinuity (Moho), P-wave velocity to Moho, geothermal gradient, etc. at various locations throughout the earth formation. Each data point, whether categorical or numerical, comprises a longitude and latitude or relative longitude/latitude relative to some frame of reference in the earth formation and, in some cases, a depth. The observed heat flow values 101 comprise heat flow values at various locations throughout the earth formation, also indexed by latitude, longitude, and depth. The data filter 102 receives and filters the geological data 103 and the observed heat flow values 101. This filtering categorizes the observed heat flow values 101 according to categorical geological data in the geological data 103 and removes anomalous/unreliable data. The data filter 102 can perform this filtering in two steps. First, categorical geological data in the geological data 103 is mapped to numerical values. For example, categorical data can be mapped to consecutive integers, each integer corresponding to a value in that category. Second, anomalous/unreliable data is removed. For example, for each type of geological data 103 and the heat flow values 101, basic statistical measures such as mean, standard deviation, median, etc. can be computed to determine and remove outliers (e.g. data points more than two standard deviations away from the mean). Data having duplicates at identical latitude and longitude can be merged by, for instance, taking a median of available values. Data at 0° latitude/longitude can be removed as likely having incorrect location data. Those of the heat flow values 101 less than 0 can be filtered to remove localized variations corresponding to local phenomena such as hydrothermal circulation, hydrothermal recharge, etc. The resulting high-quality geological data 105 and high-quality heat flow values 107 comprises more reliable geological data that better represents features of the earth formation.

The data processor 104 receives the high-quality geological data 105 and the high-quality heat flow values 107 and processes them for inputting into supervised learning models from the supervised machine learning model database 108. This data processing includes normalization of the data 105, 107 to generate normalized geological data 109 and normalized heat flow values 111. For instance, the data processor 104 can perform a linear transformation on the high-quality geological data 105 and the high-quality heat flow values 107 to have mean 0 and standard deviation 1 for each geological parameter. Other data normalization techniques, such as transformations to make the data resemble a Gaussian distribution or uniform distribution, can be implemented. The type of data normalization can depend on the type of supervised machine learning models stored in the supervised machine learning model database 108 and, in some embodiments, multiple types of data normalization can be used for multiple types of models.

The machine learning model trainer 116 iteratively trains a candidate machine learning model 106 using the normalized heat flow values 111 and the normalized geological data 109. The normalized geological data 109 is divided into training and test data, and the machine learning model trainer 116 inputs test data into each of the candidate machine learning models 106 (concurrently or at different times). Each candidate machine learning model 106 receives the test data and generates estimated heat flow values 113. The estimated heat flow values 113 are compared to the normalized heat flow values 111, and based on the difference, the machine learning model trainer 116 updates internal parameters of the corresponding one of the candidate machine learning models 106 as the model updates 123. For example, if one of the candidate machine learning models 106 is a neural network, the value of a loss function of the estimated heat flow values 113 and the normalized heat flow values 111 propagates through the internal layers of the neural network using gradient descent and the updates layers comprise the model updates 123. The machine learning models stored in the supervised machine learning model database 108 can be any type of supervised machine learning model of varying complexity including linear/ridge/lasso regression models, support vector machines, k-nearest neighbor clustering, decision trees, gradient boosting, random forests, neural networks, etc.

Once each of the candidate machine learning models 106 is trained, the final estimated heat flow values 113 are evaluated for the training and test data in order to determine how well each of the candidate machine learning models 106 satisfies a model criterion. This model criterion can be a mean absolute error, a root mean squared error, a mean squared error, an R-squared value, etc. for the test and training data against the estimated heat flow values 113. The errors for test and training data can be used as a weighted average in the model criterion to balance underfitting and overfitting. Satisfying the model criterion thus corresponds to having a low weighted average of errors. The model criterion can further include a metric of model uncertainty, and the evaluation of the model criterion can include a qualitative evaluation of models using an expert uncertainty analysis.

The geothermal flow interpolator 110 receives the optimal trained machine learning model outputs 115 from the one of the candidate machine learning models 106 that most satisfies the model criterion. The geothermal flow interpolator 110 interpolates the optimal trained machine learning model outputs 115 throughout the earth formation to generate the interpolated heat flow map 117. For instance, the geothermal flow interpolator 110 can use inverse distance weighting (e.g., Shepard's method) or any other interpolation method to determine heat flow values at a set of locations throughout the earth formation that are not included in the optimal trained machine learning model outputs 115 (e.g., a grid of points throughout the earth formation at a prespecified granularity).

Although the geothermal flow interpolator 110 is depicted as interpolating the optimal trained machine learning model outputs 115, in some embodiments the geothermal flow interpolator 110 can instead interpolate geological data 103 prior to inputting the data into an optimal trained machine learning model from the machine learning model trainer 116. Because the geological data 103 can be more widespread than the observed heat flow values 101, interpolating the geological data 103 as opposed to the optimal trained machine learning model outputs 115 means that the optimal trained machine learning model generates predictions across all locations where there is geological data 103 as opposed to interpolating the predictions themselves. For categorical data in the geological data 103, the geothermal flow interpolator 110 can use an interpolation method more suitable to discrete data. For instance, the geothermal flow interpolator 110 can assign a categorical value to each unknown data point to its; nearest neighbor in the set of known data points in the geological data 103. For continuous data in the geological data 103, the aforementioned inverse distance weighting interpolation method can be used or any other interpolation methods such as curvature interpolation, spline interpolation, etc. Once interpolated, the geological data 103 can be further processed by the data filter 102/data processor 104 to and input into the optimal trained machine learning model to generate optimal trained machine learning model outputs 115 over a wider set of locations. Interpolation before applying the candidate machine learning models 106 can result in better predictions that are more adapted to the data throughout the geological formation.

The geothermal flow cosimulator 112 receives the interpolated heat flow map 117 and the high-quality heat flow values 107 and cosimulates them to generate the cosimulated heat flow map 119. For example, the geothermal flow cosimulator 112 can use kriging with external drift with the high-quality heat flow values 107 as the dependent variable and the interpolated heat flow map 117 as the auxiliary variables. If $\{x_i\}_{i=1}^{N}$ are the locations of the high-quality heat flow values 107, $x_0$ is a new location among the locations of the interpolated heat flow map 117 for heat flow to be estimated, $q(x_0)$ is the estimated heat flow values in the interpolated heat flow map 117 at $x_0$, and $z=[z(x_1), \ldots, z(x_N)]$ is a vector of normalized heat flow values 111 at known locations, then the cosimulated value $\hat{z}(x_0)$ at the new location $x_0$ can be computed as $\hat{z}(x_0)=\Sigma_{i=1}^{N} w_i(x_0)z(x_i)$. The kriging weights $\{w_i(x_0)\}_{i=1}^{N}$ are computed by solving the equation $$\{w_1(x_0), \ldots, w_N(x_0), \varphi(x_0)\}^T = C_{res}^{-1} c_0$$

where $c_0=\{C(x_0, x_1), \ldots, C(x_0, x_N), 1, f(x_0)\}^T$ is a vector of covariances at $x_0$, $\varphi(x_0)$ is a Lagrange multiplier, and $C_{res}$ is an extended covariance matrix of residuals:

$$C_{res} = \begin{bmatrix} C(x_1, x_1) & \cdots & C(x_1, x_N) & 1 & q(x_1) \\ \cdots & & \cdots & \cdots & \cdots \\ C(x_N, x_1) & \cdots & C(x_N, x_N) & 1 & q(x_N) \\ 1 & \cdots & 1 & 0 & 0 \\ q(x_1) & \cdots & q(x_N) & 0 & 0 \end{bmatrix}$$

Other cosimulation algorithms such as regression-kriging can be used.

The spatial plotter 114 receives the cosimulated heat flow map 119 and uses the heat flow values therein to generate the raster heat flow map 121. The raster heat flow map 121 can be generated by standard rasterization algorithms that implement methods such as scanline rendering, Bresenham's line algorithm, a digital differential analyzer, etc. The rasterization can further include a graphics pipeline with an application step and a geometry step to generate primitives (e.g., polygonal objects) that are then rasterized to create the final heat flow map.

The operations in FIG. 1 are depicted as modeling heat flow throughout an earth formation. In addition or alternatively, the heat flow modeler can be trained to estimate any of the aforementioned geological parameters of the earth formation at unknown locations. Historical data for the earth formation such as paleo-elevation, paleo-sediment thickness, crust age, and apatite fission can be used as input into the machine learning geological heat flow modeler 100 to estimate historical heat flow at a point in time in the past. The estimated historical heat flow can be used to inform current geological model for other geological parameters.

Figure 2:
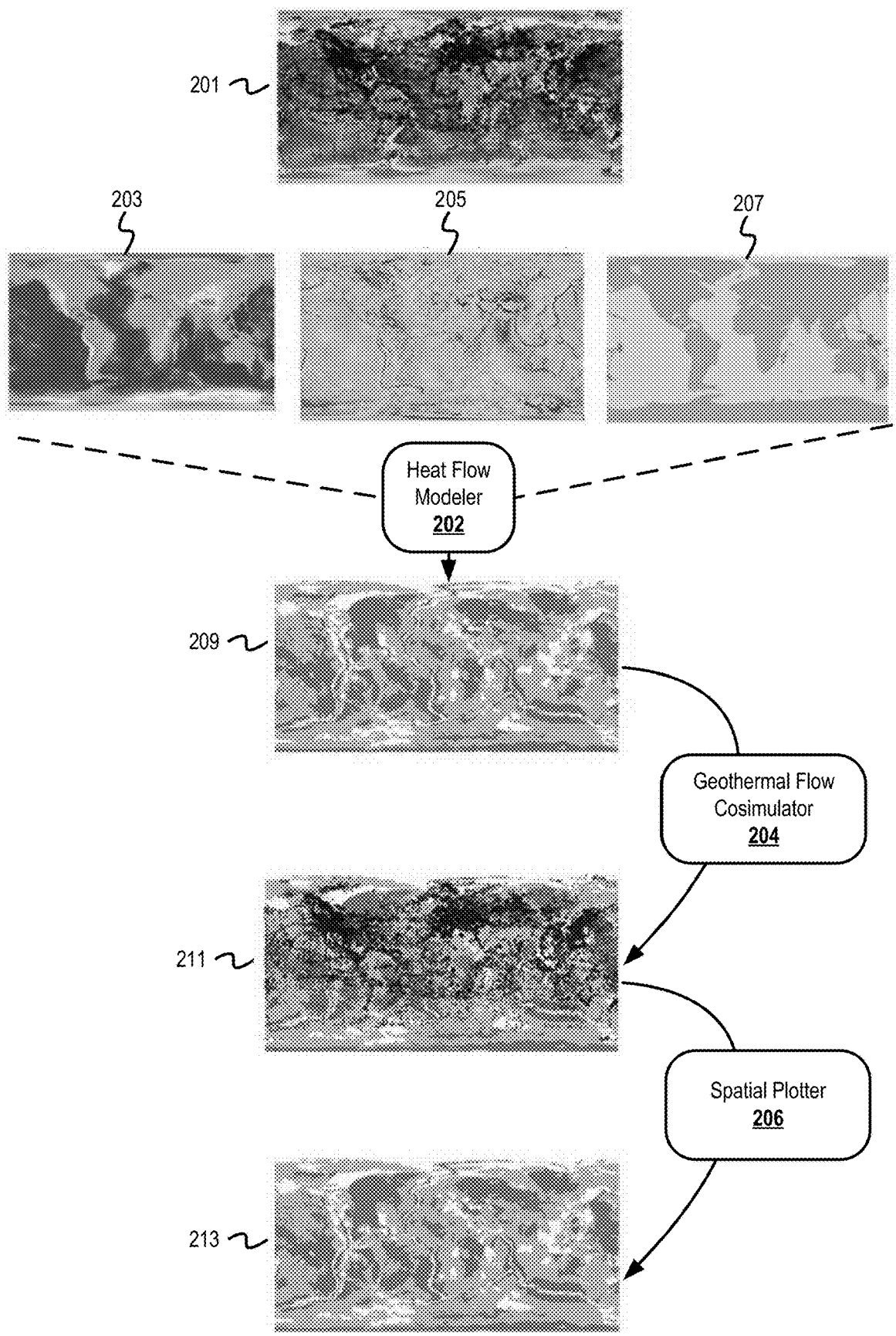
FIG. 2 is an illustrative diagram of global earth formation models cosimulated using outputs of supervised learning models and observed heat flow data.

FIG. 2 is an illustrative diagram of global earth formation models cosimulated using outputs of supervised learning models and observed heat flow data. A heat flow modeler 202 receives observed heat flow data 201, and geological parameters including crust thickness data 203, free air gravity anomaly data 205, and lithosphere type data 207. The heat flow modeler 202 generates a multivariate model 209 of heat flow of the global earth formation using outputs of a supervised machine learning model most satisfying a model criterion as previously described. A geothermal flow cosimulator 204 cosimulates the observed heat flow data 201 with the multivariate model 209 to generate a cosimulation of heat flow 211 in the global earth formation. Finally, a spatial plotter 206 generates a final heat map 213 of the global earth formation using the cosimulation of heat flow 211.

Although depicted for 3 types of geological parameters 203, 205, and 207, any of the aforementioned geological parameters can be used as input to the heat flow modeler 202 in addition to the observed heat flow data 201. The heat flow data 201 appear as dots for each location in FIG. 2, but actually represent a value for heat flow at each of the locations corresponding to a dot in the observed heat flow data 201. The heat flow modeler 202 preprocesses the data 201, 203, 205, and 207 and uses the various data to train and select a supervised machine learning model that most satisfies a model criterion to generate the multivariate model 209 of the earth formation. The depicted multivariate model 209 is interpolated to a set of locations through the earth.

The cosimulation of heat flow 211 is depicted with dots at each of the locations of the observed heat flow data 201, however these dots represent heat flow values at each of the corresponding locations. These values may differ from the values in the observed heat flow data 201 depending on the algorithm used for cosimulation. The depicted data 201, 203, 205, and 207 and the models 209, 211 are rasterizations of the corresponding heat flow and geological parameter values. Conversely, the final heat map 213 is an actual representation of the raster heat map generated from the cosimulation of heat flow 211 by the spatial plotter 206.

Figure 3:
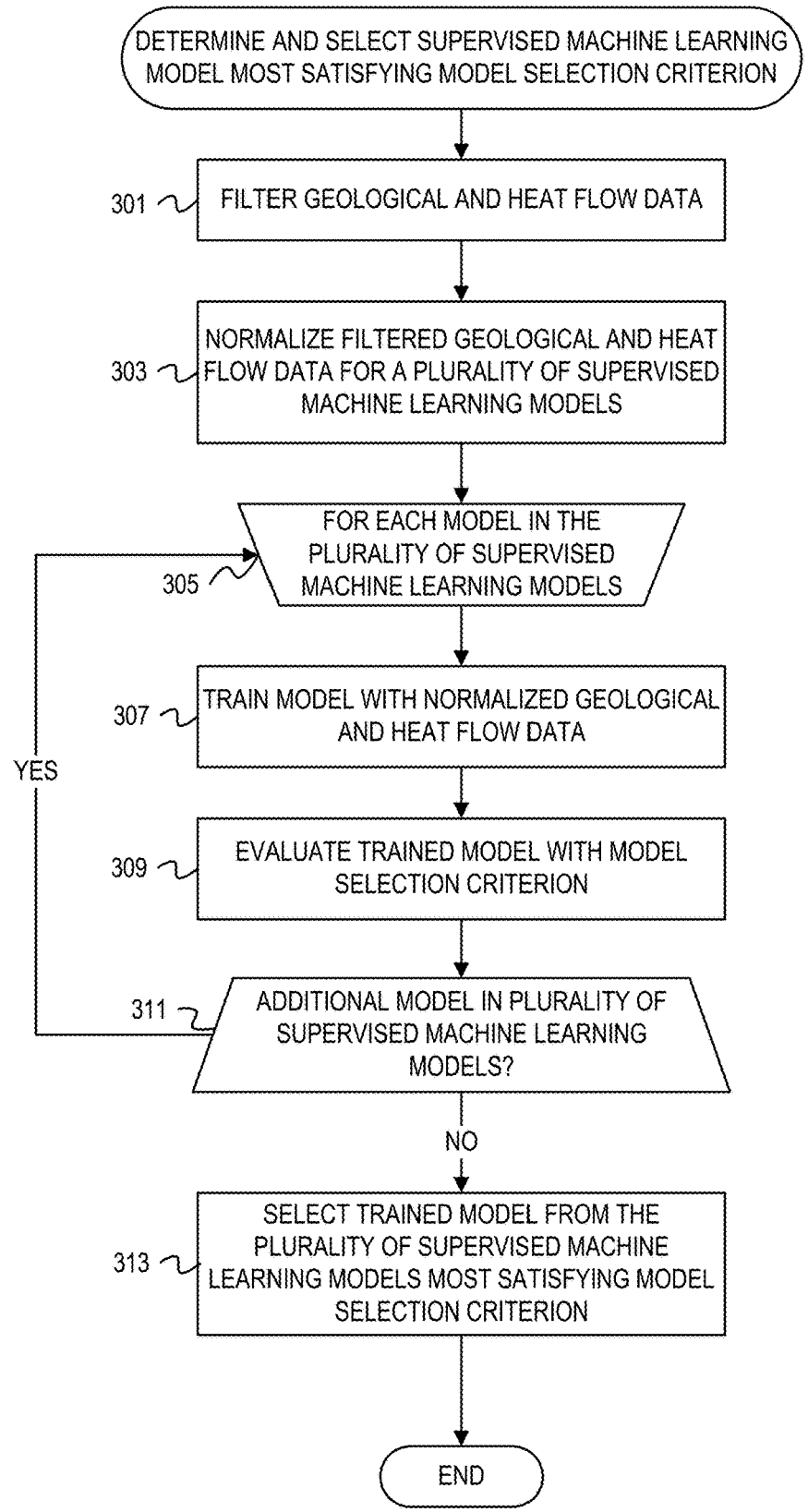
FIG. 3 is a flowchart of example operations for determining a supervised machine learning model most satisfying a model selection criterion.
Figure 4:
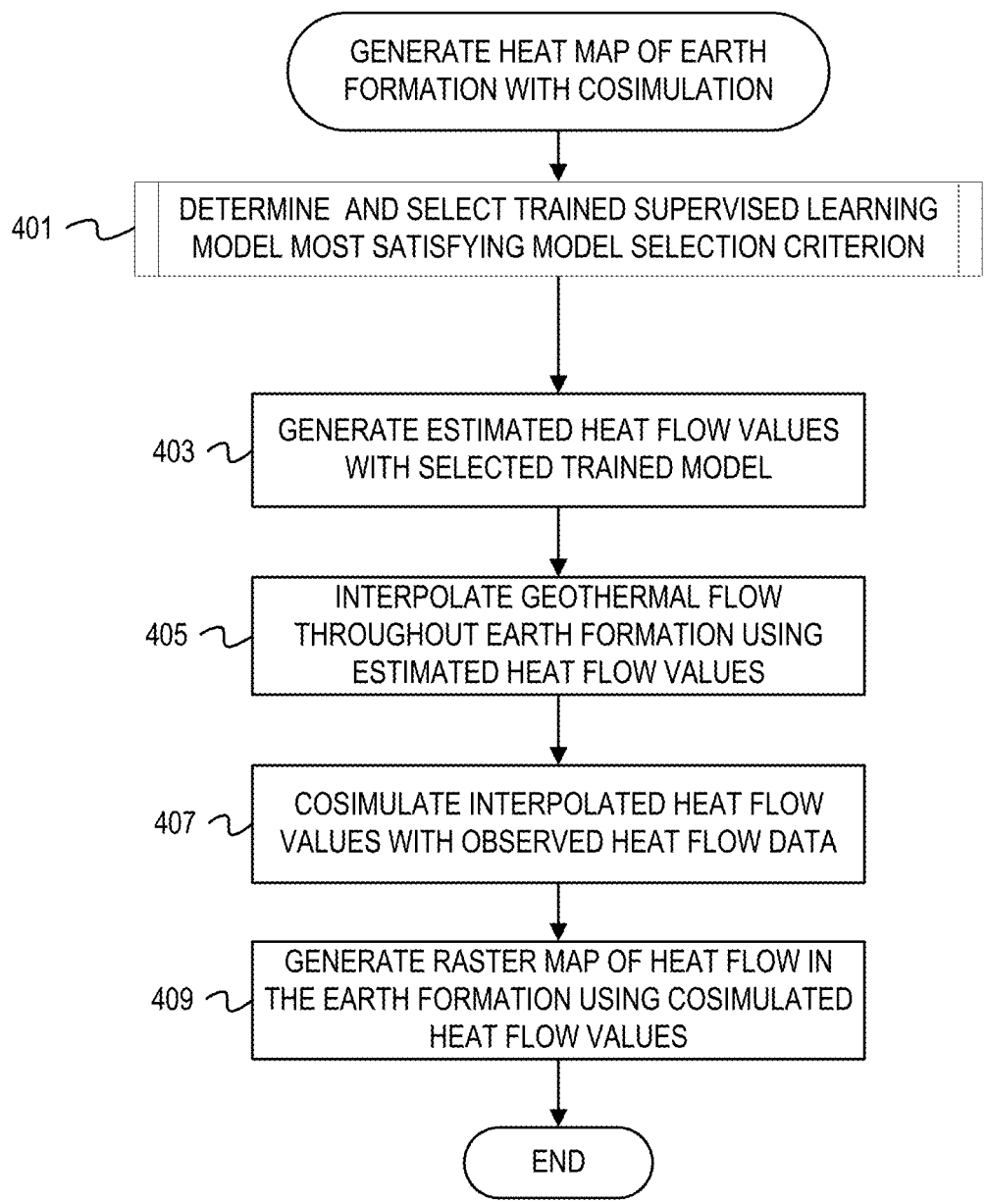
FIG. 4 is a flowchart of example operations for generating a heat map of an earth formation using cosimulation.

FIGS. 3 and 4 are flowcharts for model selection and heat map generation with cosimulation. The example operations in FIGS. 3 and 4 are described with reference to a heat flow modeler for consistency with the earlier figure(s). The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for determining and selecting a supervised machine learning model most satisfying a model selection criterion. At block 301, the heat flow modeler filters geological and heat flow data for an earth formation. The geological data can be categorical or numerical data and can correspond to various geological properties of an earth formation including lithotype data, crust thickness data, free gravity anomaly data, basement data, elevation data, sediment thickness data, Moho data, etc. The heat flow data corresponds to observed heat flow at various locations throughout the earth formation. The filtering operation includes removing outliers from the geological and heat flow data, removing or merging redundant data, removing unreliable or faulty data, etc. Outliers can include numerical data outside of a threshold distance from the mean and data corresponding to localized geological phenomena (e.g. hydrothermal recharge). Redundant data includes duplicate data and data with identical locations in the earth formation and can be merged by computing a mean of numerical data values. Unreliable or faulty data includes data with zero longitude/latitude coordinates (indicating a faulty location).

At block 303, the heat flow modeler normalizes the filtered geological and heat flow data for a plurality of supervised machine learning models. Normalizing the data comprises mapping categorical geological data onto numerical data using an integer scale with a number of entries identical to the number of categories for each categorical geological parameter. The data can be further normalized to be more effective for training a particular type of supervised machine learning model. For example, when the supervised machine learning model is a neural network, the data can be normalized to have zero mean and standard deviation one for each numerical parameter, can be normalized to resemble a Gaussian distribution (or other desired distribution), and can be supplemented by data augmentation e.g. by random rotations/translations of the data. Multiple normalizations of the geological and heat flow data can be stored corresponding to different models to be implemented.

At block 305, the heat flow modeler begins iterating over the plurality of supervised machine learning models. Supervised machine learning models in the plurality of machine learning models can be of different types and can have different input formats, different architectures, different output types, etc.

At block 307 the heat flow modeler trains the current supervised machine learning model with a training subset of the normalized heat flow and geological data corresponding to the current supervised machine learning model generated at block 303. The training can depend on the type of supervised learning model and can consist of a single iteration (e.g. matrix inversion for a regression model) or a sequence of iterations with a termination criterion (e.g., for a neural network, gradient booster, etc.). Once trained, the trained supervised machine learning model can be validated on a testing subset of the normalized heat flow and geological data.

At block 309, the heat flow modeler evaluates the trained supervised machine learning model trained at block 307 using a model selection criterion. The model selection criterion can vary depending on the type of supervised machine learning model. For instance, for a regression model the model selection criterion can include training error, validation error, and a model uncertainty analysis related to probability distributions generated on the regression coefficients. Conversely, for a neural network a more sophisticated uncertainty analysis combining a Bayesian model with the neural network framework can be used. The model criterion can include both a quantitative (e.g. test and training error) component and a qualitative (e.g. uncertainty analysis) component.

At block 311, the heat flow modeler determines whether there is an additional model in the plurality of supervised machine learning models. If an additional model is found, operations return to block 305. Otherwise, operations continue to block 313.

At block 313, the heat flow modeler selects a trained model from the plurality of supervised machine learning models most satisfying the model criterion. The trained model is selected based on the model selection criterion evaluated at block 309. In some embodiments, the model criterion is a quantitative metric (e.g. a weighted combination of training error and test error) and the trained model most satisfying the model selection criterion is the trained model with the smallest quantitative metric. Alternatively, when the model selection criterion includes a quantitative and qualitative metric, the model selection criterion can comprise an expert evaluation of each model and its' merits and/or disadvantages for modeling heat flow based on the chosen earth formation, the amount of available training data, the qualitative and quantitative model selection metrics, etc. In embodiments where models are evaluated using different model criteria, the model most satisfying the model criterion can be chosen by a combined ranking system using rankings of the respective quantitative and qualitative metrics. Rankings of models using qualitative metrics such as model uncertainty can be done by a domain expert performing a qualitative analysis on the respective models. Models having different quantitative metrics can be ranked by normalizing the quantitative metrics to a common scale, for instance, normalizing the metrics to have values between 0 and 1 or to resemble a probability distribution (e.g. standard normal Gaussian). Combining the quantitative and qualitative model rankings can comprise assigning scores to each model based on their respective rankings and adding the scores for the quantitative and qualitative rankings. The final ranking can be determined by the sum of scores for each model. Selection of the model may be identifying a memory location of the trained model, storing an identifier or reference of the trained model, passing a reference to the trained model to another process, etc.

FIG. 4 is a flowchart of example operations for generating a heat map of an earth formation using cosimulation. At block 401, a heat flow modeler determines and selects a trained supervised machine learning model most satisfying a model selection criterion. The operation at block 401 is described in greater detail with reference to FIG. 3.

At block 403, the heat flow modeler generates estimated heat flow values with the trained supervised machine learning model most satisfying a model selection criterion determined at block 401. The estimated heat flow values are generated by inputting normalized geological data for the earth formation into the trained supervised machine learning model.

At block 405, the heat flow modeler interpolates geothermal heat flow throughout the earth formation using the estimated heat flow values generated at block 403. The interpolation populates heat flow values at locations throughout the earth formation using the estimated values at a subset of locations. The locations can be arranged in a grid of some granularity or can be a set of locations of interest (e.g., known locations of drill sites). The interpolation can occur using any standard interpolation techniques e.g. by computing a weight linear combination of nearby estimated geothermal heat flow values when interpolating unknown heat flow values. Inverse distance weighting can be used to interpolate these unknown heat flow values.

Although depicted as occurring after generating estimated heat flow values with the selected trained model, the operation in block 405 can be performed on input geological data prior to generating estimated heat flow values with the selected trained model at block 403. The heat flow modeler can then apply appropriate interpolation methods to different geological data, for example interpolate categorical data in the filtered geological data using a different interpolation method (e.g. nearest neighbors) than the continuous data in the filtered geological data and heat flow data which can be interpolated using the various aforementioned methods.

At block 407, the heat flow modeler cosimulates the interpolated heat flow values generated at block 405 with the observed heat flow data. Any standard cosimulation algorithm for geostatistical cosimulation including regression-kriging, kriging with external drift, etc. The resulting cosimulated values comprise values of heat flow throughout the earth formation that incorporate the estimated heat flow values while remaining true to the observed heat flow data.

At block 409, the heat flow modeler generates a raster map of heat flow in the earth formation using the cosimulated heat flow values. The raster map can be generated in three stages—an application stage, a geometry stage, and a rasterization stage. The application stage comprises spatial subdivision schema that subdivide the heat flow values in the earth formation, with finer subdivisions for denser locations of heat flow values (e.g. using Quadtrees or Octrees). The geometry stage comprises a sequence of geometrical transformation (e.g. rotation, projection) to generate a set of primitives comprising polygonal shapes to be rendered at the rasterization stage. The rasterization stage converts the primitives generated at the geometry stage into a set of discrete pixels based on a set of rasterization rules that ensures the primitives are accurately discretized. Less complex schema can be used for simpler heat flow models. For instance, if the heat flow values are a 2-dimensional grid, the raster map can comprise a pixel for each point on the grid, each pixel comprising a shade corresponding to the magnitude of the heat flow value at the point on the grid.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 301 and 303 can be performed in parallel or concurrently. With respect to FIG. 4, generating a raster map of heat flow in the earth formation is not necessary. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 5:
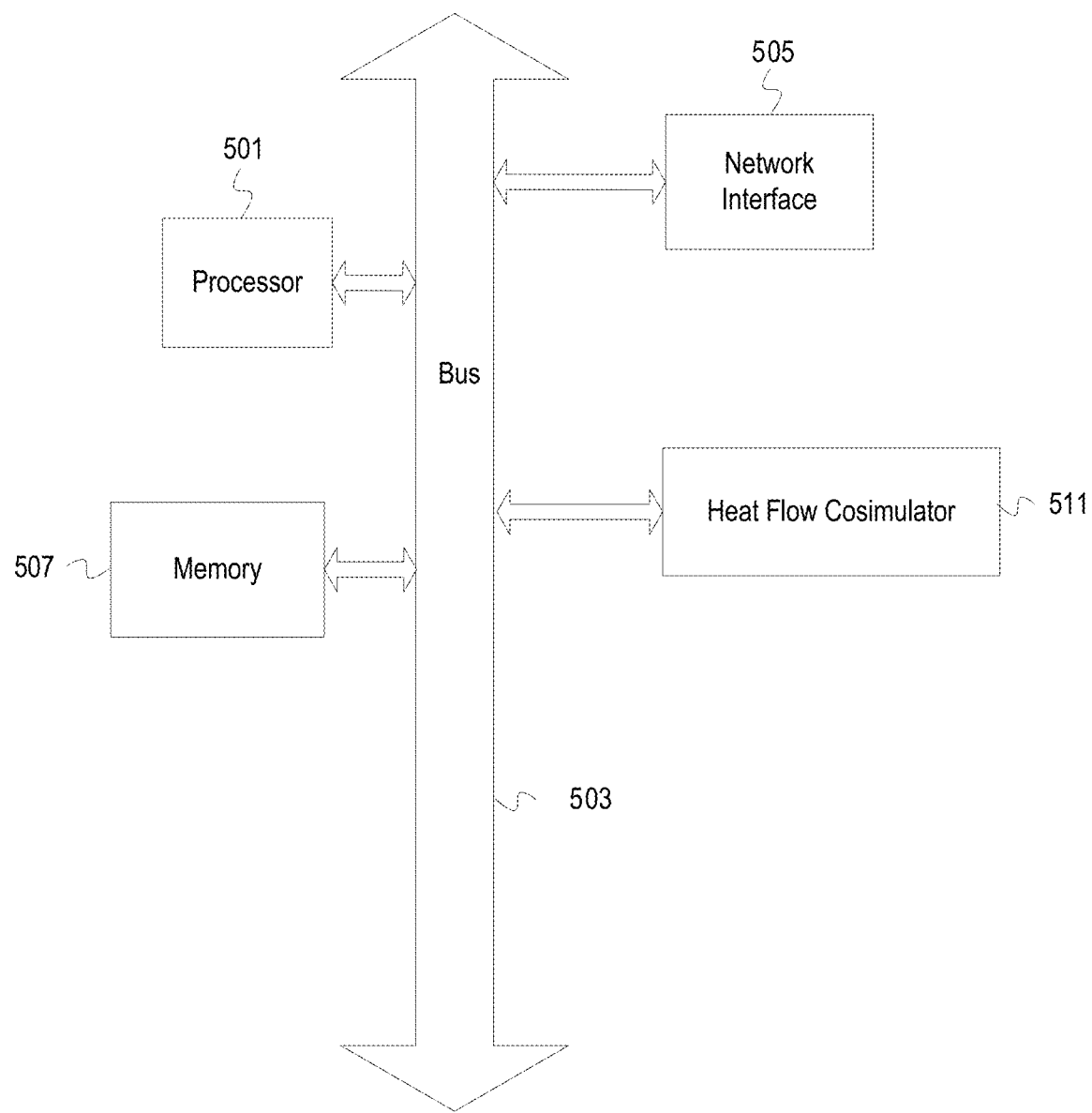
FIG. 5 depicts an example computer system with a heat flow cosimulator.

FIG. 5 depicts an example computer system with a heat flow cosimulator. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes a heat flow cosimulator 511. The heat flow cosimulator 511 cosimulates estimated heat flow from a supervised machine learning model most satisfying a model criterion and observed heat flow values as described variously above. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501 and the network interface 505 are coupled to the bus 503. Although illustrated as being coupled to the bus 503, the memory 507 may be coupled to the processor 501.

While the aspects of the disclosure are described with reference to various implementations and exploitations, it will be understood that these aspects are illustrative and that the scope of the claims is not limited to them. In general, techniques for cosimulating estimated heat flow and observed heat flow to increase accuracy of a resultant heat flow map as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
receiving a plurality of aggregated observed heat flow values and geological data for an earth formation;
processing the observed heat flow values and geological data to filter out unreliable data using statistical measures, wherein unreliable data includes data points more than a specified statistical measure away from a mean value of the data;
normalizing the processed observed heat flow values and geological data, wherein normalizing the data includes mapping categorical geological data onto numerical data using an integer scale with a number of entries identical to a number of categories for each categorical geological parameter;
training each supervised learning model in a plurality of supervised learning models to estimate a plurality of heat flow values, wherein the training includes,
separating the normalized observed heat flow values and geological data into training data and test data,
generating estimated heat flow values from the test data,
comparing the estimated heat flow values with the normalized data, and
propagating the value of a loss function of the estimated heat flow values and the normalized heat flow values backward through layers of each model using gradient descent to update the model based on the comparison of the estimated heat flow values with the normalized data;
evaluating errors of each of the trained supervised learning models using the training data and the test data;
selecting a first selected model meeting according to a corresponding model selection criterion, wherein the model selection criteria includes at least selecting a model having a lowest weighted average of errors;
cosimulating the estimated plurality of heat flow values of the first selected model and the plurality of observed heat flow values to generate a cosimulated heat flow map; and
using the cosimulated heat flow map as input to one or more processing operations for facilitating subsurface formation evaluation.

2. The method of claim 1, wherein the model selection criterion comprises at least one of a weighted combination of a model training error and a model validation error, and a model uncertainty value.

3. The method of claim 2, wherein the model selection criterion includes at least one of a mean absolute error, a root mean squared error, a mean squared error, or an R-squared value for testing and training data against the plurality of estimated heat flow values.

4. The method of claim 1, wherein cosimulating the estimated plurality of heat flow values and the plurality of observed heat flow values comprises kriging with external drift using the plurality of observed heat flow values as dependent variables and the estimated plurality of heat flow values as auxiliary variables.

5. The method of claim 1, wherein processing the observed heat flow values and geological data includes interpolating an initial plurality of geological data.

6. The method of claim 1, wherein cosimulating the estimated plurality of heat flow values of the first selected model comprises interpolating the estimated plurality of heat flow values to a set of locations throughout an earth formation to generate an interpolated plurality of heat flow values and cosimulating the plurality of observed heat flow values and the interpolated plurality of heat flow values.

7. The method of claim 1, wherein processing the observed heat flow values and geological data includes filtering out unreliable data using statistical measures.

8. The method of claim 7, wherein filtering out the unreliable data comprises filtering the geological data to, at least one of, remove redundant data, merge redundant data, remove anomalous data, remove faulty data, or remove unreliable data.

9. The method of claim 7, wherein the specified statistical measure is two standard deviations away from the mean.

10. The method of claim 1, wherein the geological data includes the categorical geological data and the numerical geological data.

11. The method of claim 1, wherein training two or more machine learning models includes a single training iteration for two or more regression machine learning models and a sequence of iterations for two or more neural network.

12. A non-transitory, computer-readable medium having instructions stored thereon that are executable by a computing device to perform operations comprising:

instructions to receive a plurality of aggregated observed heat flow values and geological data for an earth formation;
instructions to process the observed heat flow values and geological data to filter out unreliable data using statistical measures, wherein unreliable data includes data points more than a specified statistical measure away from a mean value of the data;
instructions to normalize the processed observed heat flow values and geological data, wherein normalizing the data includes mapping categorical geological data onto numerical data using an integer scale with a number of entries identical to a number of categories for each categorical geological parameter;
instructions to train each supervised learning model in a plurality of supervised learning models, instructions to estimate a plurality of heat flow values, wherein the training includes,
  instructions to separate the normalized data into training data and test data, and
  instructions to generate estimated heat flow values from the test data,
  instructions to compare the estimated heat flow values with the normalized data,
  instructions to propagate the value of a loss function of the estimated heat flow values and the normalized heat flow values backward through layers of each model using gradient descent to update the model based on the comparison of the estimated heat flow values with the normalized data
  instructions to train each of the supervised learning models with the test data of the normalized data;
instructions to evaluate errors of each of the plurality of trained supervised learning models using the training and test data;
instructions to select a first selected model meeting a corresponding model selection criterion wherein the model selection criteria includes at least selecting a model having a lowest weighted average of errors;
instructions to cosimulate the estimated plurality of heat flow values of the first selected model and the plurality of observed heat flow values to generate a cosimulated heat flow map; and
instructions to use the cosimulated heat flow map as input to one or more processing operations for facilitating subsurface formation evaluation.

13. The non-transitory, computer-readable medium of claim 12, wherein the model selection criterion comprises a weighted combination of a model training error and a model validation error.

14. The non-transitory, computer-readable medium of claim 13, wherein the model selection criterion further comprises an uncertainty value.

15. The non-transitory, computer-readable medium of claim 12, wherein the instructions executable by the computing device to cosimulate the estimated plurality of heat flow values and the plurality of observed heat flow values comprise instructions to krige with external drift using the plurality of observed heat flow values as dependent variables and the estimated plurality of heat flow values as auxiliary variables.

16. The non-transitory, computer-readable medium of claim 12, wherein the instructions to process the observed heat flow values and geological data include instructions to interpolate an initial plurality of geological data to generate the processed heat flow values and geological data.

17. An apparatus comprising:
a processor; and
a computer-readable medium having instructions stored thereon that are executable by the processor to cause the apparatus to,
  receive a plurality of aggregated observed heat flow values and geological gradient values for an earth formation;
  process the observed heat flow values and geological gradient values to filter out unreliable data using statistical measures, wherein unreliable data includes data points more than a specified statistical measure away from a mean value of the data;
  normalizing the processed observed heat flow values and geological gradient values that include at least include a plurality of observed geothermal gradient values, wherein normalizing includes mapping categorical geological data onto numerical data using an integer scale with a number of entries identical to the number of categories for each categorical geological parameter, and
  training each supervised learning model in a plurality of supervised learning models to estimate a plurality of heat flow values, wherein the training includes,
    separating the normalized observed heat flow values into training data and test data,
    generating estimated heat flow values from the test data,
    comparing the estimated heat flow values with the normalized data, and propagating the value of a loss function of the estimated heat flow values and the normalized heat flow values backward through layers of each model using gradient descent to update the model based on the comparison of the estimated heat flow values with the normalized data;
  evaluating errors of each of the plurality of trained supervised learning models;
  selecting a first selected model meeting according to a corresponding model selection criterion wherein the model selection criteria includes at least selecting a model having a lowest weighted average of errors;
  cosimulate the estimated plurality of geothermal gradient values of the first selected trained supervised learning model and the plurality of observed geothermal gradient values to generate a cosimulated geothermal gradient map; and
  use the cosimulated geothermal gradient map as input to one or more processing operations for facilitating subsurface formation evaluation.

18. The apparatus of claim 17, wherein the model selection criterion comprises a weighted combination of a model training error and a model validation error.

19. The apparatus of claim 18, wherein the model selection criterion further comprises an uncertainty value.

20. The apparatus of claim 17, further comprising instructions executable by the processor to cause the apparatus to estimate subsurface temperatures based, at least in part, on the cosimulated geothermal gradient map.

* * * * *